H. E. & H. C. COX.
VALVE.
APPLICATION FILED SEPT. 12, 1913.
1,089,331.
Patented Mar. 3, 1914.
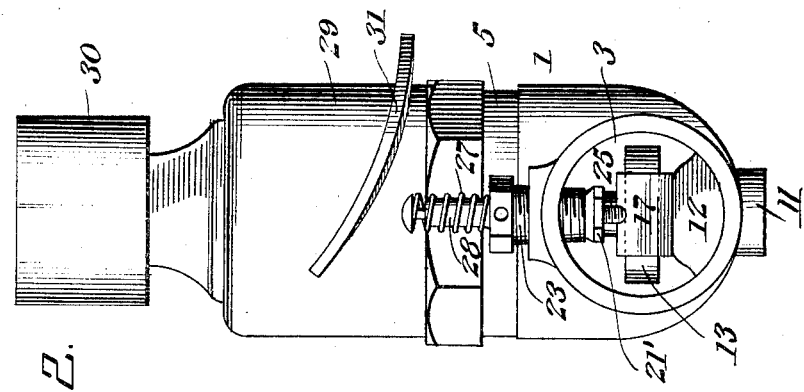
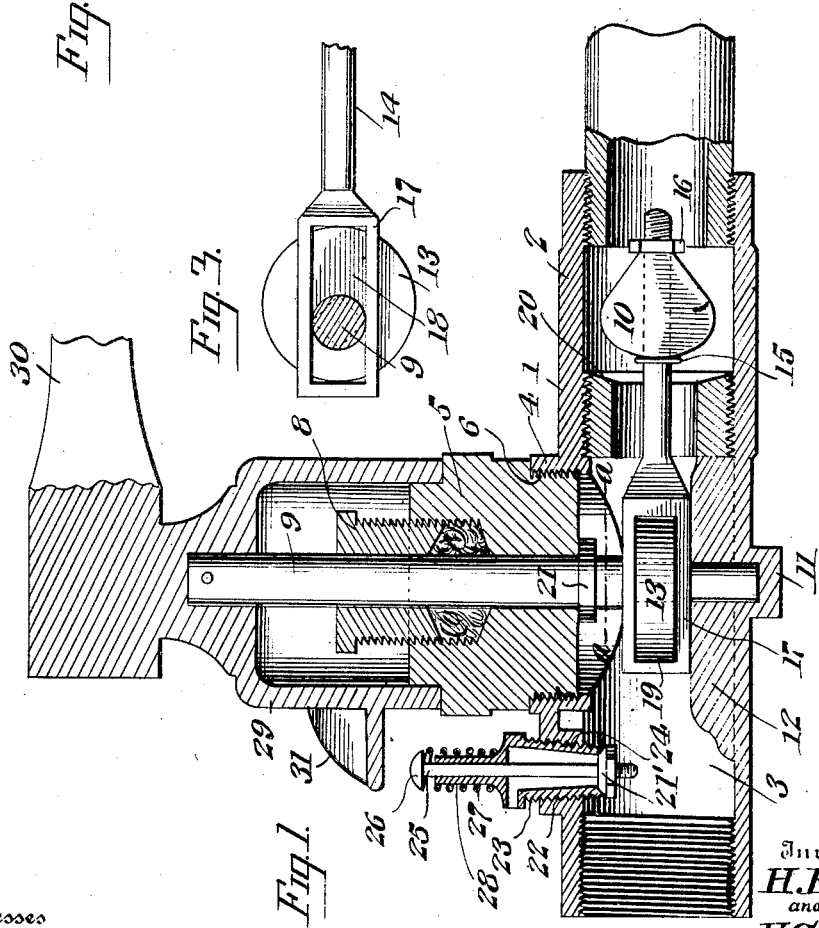
Witnesses
Frederic W. Ely.
J. W. Garner
Inventors
H. E. Cox
and
H. C. Cox
By Victor J. Evans
Attorney

UNITED STATES PATENT OFFICE.

HENRY EDWARD COX AND HENRY CICERO COX, OF EAST ST. LOUIS, ILLINOIS.

VALVE.

1,089,331.

Specification of Letters Patent.

Patented Mar. 3, 1914.

Application filed September 12, 1913. Serial No. 789,510.

*To all whom it may concern:*

Be it known that we, HENRY EDWARD COX and HENRY CICERO COX, citizens of the United States, residing at East St. Louis, in the county of St. Clair and State of Illinois, have invented new and useful Improvements in Valves, of which the following is a specification.

This invention is an improved stop and waste valve for use in connection with a hydrant or the like to drain the distribution pipes when the main supply valve is shut off and to close the drain valve automatically when the main or supply valve is open, the invention consisting in the construction, combination and arrangement of devices hereinafter described and claimed.

Figure 1 is a vertical central sectional view of a hydrant stop and waste drain valve constructed in accordance with our invention, showing the main valve opening and the waste or drain valve closed. Fig. 2 is an elevation of the same at right angles to Fig. 1. Fig. 3 is a detail sectional view of the same on the plane indicated by the line *a—a* of Fig. 1.

The casing 1 of our improved stop and drain or waste valve is provided with a tubular arm 2 to which the supply pipe is coupled, a tubular arm 3, in line with the arm 2 and to which the distribution pipe is adapted to be coupled, and a short tubular arm 4 which is arranged at right angles to the arms 2 and 3 and between them and to which a stuffing box 5 is threaded as at 6, the stuffing box being provided with a polygonal flange or head to enable it to be readily screwed in place or removed from the valve casing by means of a suitable wrench. The packing nut or gland of the stuffing box is indicated at 8.

An operating stem for the main valve 10 is indicated at 9 the said operating stem extending through and being revoluble in the packing box and its lower or inner end being stepped in a bearing recess 11 which is formed in the bottom of the casing 1, the bottom of the casing being also provided with an offset 12 on its inner side. This stem 9 has an eccentric cam 13. The valve 10 is secured on a rod 14 and is removable therefrom the said valve when in place on the rod bearing against a stop flange 15 with which the rod is provided and being held by a nut 16 which is screwed on the rod. The inner end of the rod 14 is broadened as at 17 and provided with a slot 18 to clear the operating stem 9 and is also provided with a slot 19 in which the eccentric cam 13 operates so that when the cam is turned by the operating stem 9 it moves the valve 10 to open or closed position with respect to the valve seat 20 which is threaded in the inner portion of the intake arm 2, and is removable therefrom. The operating stem has a stop flange 21 formed annularly thereon and which bears against the bottom of the inner end of the stuffing box.

A waste or drain valve 21' is arranged to open or close against a seat in the lower end of the tapered threaded portion 22 of a casing 23, the said threaded portion 22 of the casing being fitted detachably in a threaded opening 24, with which the valve casing 1 is provided at a point near the inner end of the arm 3. The valve 21' is screwed on the lower end of the operating rod 25 which extends through and is movable vertically or longitudinally in the bore of the casing 23 and is provided at its outer upper end with a diametrically enlarged head 26. A spring 27 is provided which is arranged in a coil and is fitted on the reduced upper portion 28 of the waste valve casing 23, the upper end of the said spring bearing against the head 26 and said spring acting to normally close the waste valve 21 against its seat.

To the upper portion of the valve operating stem 9 is atached a tubular housing 29 which covers the stuffing box 5 and is adapted to turn with the said valve operating stem, a handle 30 being attached to the upper end of the said housing. On one side of the tubular housing is a cam 31 which is arranged to bear on the head 26 of the operating rod of the waste valve. When the stem 9 is turned by the head or handle 30 to cause the eccentric cam 13 to open the valve 10 and permit water to be supplied to the distribution pipe the cam 31 releases the operating rod 25 of the waste valve 21' and said valve is closed by the action of the spring 27. When the operating stem 9 is turned in the reverse direction to cause the valve 10 to be closed against the seat 20 and thus cut off the supply of water to the distribution pipes the cam 31 which turns with said operating stem 9 engages the head 26 of the rod 25 and depresses said rod against the tension of the spring 27 thereby causing the drain valve or waste valve 21 to be opened so as to drain the distribution pipe and the valve casing 1.

The stop valve 10 may be readily removed from the rod 14 for purposes of repair, the valve seat 20 may also be readily removed from the supply arm of the valve casing 1 and the drain valve 21′ is carried by and connected to its casing 23 which is removably attached to the distribution arm of the valve casing 1, and the stuffing box, operating stem 9 and housing 29 being also removable, and the parts of our improved stop and waste valve may be disassembled thus facilitating repairs and enabling our improved stop and drain valve to be kept in operative condition at all times with very little attention.

Having thus described our invention we claim:

The herein described stop and waste valve comprising a valve casing having a duct extending therethrough and provided with a valve seat in said duct, a waste valve for said duct having an operating rod and a spring, the latter to normally close the waste valve, an operating stem mounted in the valve casing for rotation and extending across the duct, a cam on said operating stem, a main valve to open from and close against the valve seat, a rod attached to said main valve and engaged and operated by the cam of the operating stem, a second cam for coacting with the rod of the waste valve to open the latter against the tension of its spring simultaneously with the closing of the main valve by the first-named cam, a stuffing box for the operating stem secured to the valve casing at one side of the duct, and a housing for the stuffing box attached to and movable with the operating stem and to which housing the second named cam is attached.

In testimony whereof we affix our signatures in presence of two witnesses.

HENRY EDWARD COX.
HENRY CICERO COX.

Witnesses:
STEPHEN D. SEXTON,
MAMIE BONEAU.